(12) United States Patent
Marr et al.

(10) Patent No.: US 9,274,542 B2
(45) Date of Patent: Mar. 1, 2016

(54) CREATION OF RADIO WAVEFORMS ACCORDING TO A PROBABILITY DISTRIBUTION USING WEIGHTED PARAMETERS

(71) Applicant: RAYTHEON COMPANY, Waltham, MA (US)

(72) Inventors: Harry B. Marr, Manhattan Beach, CA (US); Daniel Thompson, Hermosa Beach, CA (US); Jeffery J. Logan, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 182 days.

(21) Appl. No.: 14/091,781

(22) Filed: Nov. 27, 2013

(65) Prior Publication Data

US 2015/0147985 A1 May 28, 2015

(51) Int. Cl.
*H04B 1/00* (2006.01)
*G06F 1/03* (2006.01)

(52) U.S. Cl.
CPC .................................. *G06F 1/0321* (2013.01)

(58) Field of Classification Search
CPC ...................................................... H04B 1/0003
See application file for complete search history.

(56) References Cited

U.S. PATENT DOCUMENTS

| | | | |
|---|---|---|---|
| 4,499,551 A * | 2/1985 | Frank | 708/250 |
| 6,121,533 A * | 9/2000 | Kay | 84/616 |
| 6,381,261 B1 * | 4/2002 | Nagazumi | 375/138 |
| 2006/0019679 A1 * | 1/2006 | Rappaport et al. | 455/456.5 |
| 2007/0038413 A1 * | 2/2007 | Mehta et al. | 702/189 |
| 2008/0320067 A1 * | 12/2008 | Swarts et al. | 708/252 |
| 2009/0228238 A1 * | 9/2009 | Mansinghka et al. | 702/181 |
| 2012/0045053 A1 * | 2/2012 | Qi et al. | 380/252 |

* cited by examiner

*Primary Examiner* — David Bilodeau
(74) *Attorney, Agent, or Firm* — Burns & Levinson LLP; Joseph M. Maraia

(57) ABSTRACT

Described herein are methods and systems capable of generating weighted parameter sets, which can be randomly addressed for dictating a waveform of each pulse to be generated by using a probability distribution function loader to load a memory table with waveform parameter values, wherein the values are loaded according to a weighted probability distribution function. Each value is then randomly addressed in the memory table and/or randomly selected from the memory table by a random number generator and fed into a signal generation circuit for creation of the waveform to be transmitted.

26 Claims, 4 Drawing Sheets

CREATION OF RADIO WAVEFORMS ACCORDING TO A PROBABILITY DISTRIBUTION USING WEIGHTED PARAMETERS

TECHNICAL FIELD

The present disclosure relates generally to the field of radio waveform generation. More particularly, this application relates to the technology of weighted waveform parameter modification.

BACKGROUND

In various electronic signal applications, e.g., communications, mobile phones, mobile data, RADAR, LADAR, electronic jamming, and/or any other civilian or military electronic signal application, it is often desirable to transmit or detect one or more signals having a varying parameter set, e.g., frequency, pulse width, amplitude, pulse repetition rate, chirp rate. For example, in various applications, it is desirable for one or more parameters of an electronic signal system to be "agile", i.e., variable, from pulse to pulse.

In various state of the art applications, parameter sets are determined a priori in a lookup table fashion. The operating conditions are identified and a single parameter set or a fixed sequence of parameter sets, determined a priori for the operating condition, are looked up in a database through a standard lookup table. In various other applications, pseudo-random number generators are often used to create "random" pulse-to-pulse agile waveforms. In other fields, random number generators are used to vary pulse width for power electronics. Each of these methodologies relies on fixed parameter sets or uniformly "random" parameter distributions (i.e., for each parameter, the uniformly random distribution is designed to spend uniform dwell time on each value) to vary transmitted signal properties.

However, in various applications, dwell time for some values of each parameter is preferably higher or lower than for others. For example, in some applications, it may be desirable to increase or decrease dwell time on one or more particular frequencies because the frequency is more or less useful than others, because more systems generally operate at that frequency, because conditions dictate that the frequency is more likely to be preferred, because there are a plurality of systems operating at different frequencies, because the system can transmit at a plurality of different frequencies, where some frequencies need to be used more often than others, or because the particular frequency is otherwise considered a higher or lower priority.

SUMMARY

A need therefore exists for methods and systems for generating weighted parameter sets, which can be randomly addressed for dictating a waveform of each pulse to be generated.

In one aspect, at least one embodiment described herein provides a method for a radio waveform generation device. The radio waveform generation device includes a signal generation circuit for generating a plurality of signals for transmission by the radio waveform generation device, each of the plurality of signals being characterized by a first parameter, the signal generation circuit generating the plurality of signals using a respective plurality of values of the at least one parameter. The radio waveform generation device also includes a memory for storing the plurality of values of the at least one parameter according to a predetermined probability distribution function, the signal generation circuit being configured to receive one of the values of the at least one parameter for each respective one of the generated plurality of signals and generate the one of the generated plurality of signals using the received one of the plurality of values of the parameter.

Any of the aspects and/or embodiments described herein can include one or more of the following embodiments. In some embodiments, each value of the at least one parameter is stored in the memory in a quantity of repetitive occurrences, the quantity of repetitive occurrences of each value being determined according to the probability distribution function. In some embodiments, each value of the at least one parameter is selected from the memory at random for use by the signal generation circuit in generating the respective signal. In some embodiments, each value of the at least one parameter is selected from the memory at random for use by the signal generation circuit in generating the respective signal. In some embodiments, the memory stores a second plurality of values of the at least one parameter according to a second predetermined probability distribution function. In some embodiments, the signal generation circuit generates a second plurality of signals for transmission by the radio waveform generation device, each of the second plurality of signals being characterized by the at least one parameter, the signal generation circuit being configured to generate the second plurality of signals respectively using the second plurality of values of the at least one parameter.

In some embodiments, each of the signals is characterized by at least one second parameter. In some embodiments, the signal generation circuit generating the plurality of signals using a respective second plurality of values of the at least one second parameter. In some embodiments, the memory stores the second plurality of values of the at least one second parameter according to a second predetermined probability distribution function, the signal generation circuit receiving one of the second plurality of values of the at least one second parameter for each respective one of the generated plurality of signals and generating the one of the generated plurality of signals using the received one of the second plurality of values of the at least one parameter.

In some embodiments, the at least one parameter is related to a center frequency of at least one of the plurality of signals. In some embodiments, the at least one parameter is related to noise characteristics related to at least one of the plurality of signals. In some embodiments, the at least one parameter is related to chirp characteristics related to at least one of the plurality of signals. In some embodiments, the at least one parameter is related to frequency-shift keying (FSK) parameters related to at least one of the plurality of signals. In some embodiments, the at least one parameter is related to inter-pulse modulation characteristics related to at least one of the plurality of signals. In some embodiments, the probability distribution function is a Gaussian probability distribution function.

In one aspect, at least one embodiment described herein provides a method for generating radio frequency waveform signals in a radio waveform generation device. In some embodiments the method includes storing a plurality of values of at least one parameter according to a predetermined probability distribution function, the at least one parameter characterizing a plurality of signals for transmission by the radio waveform generation device. The method also includes receiving one of the stored plurality of values of the at least one parameter for each respective one of the plurality of signals. The method also includes generating each respective one of the generated plurality of signals using the respective received one of the plurality of values of the parameter.

Any of the aspects and/or embodiments described herein can include one or more of the following embodiments. In some embodiments, each value of the at least one parameter is stored in a memory in a quantity of repetitive occurrences, the quantity of repetitive occurrences of each value being determined according to the probability distribution function. In some embodiments, each value of the at least one parameter is selected from the memory at random for use in generating the respective signal. In some embodiments, each value of the at least one parameter is selected at random for use in generating the respective signal. In some embodiments, the method also includes storing a second plurality of values of the at least one parameter according to a second predetermined probability distribution function. In some embodiments, the method also includes generating a second plurality of signals for transmission by the radio waveform generation device, each of the second plurality of signals being characterized by the at least one parameter, the second plurality of signals being generated using the second plurality of values of the at least one parameter, respectively. In some embodiments, each of the plurality of signals is characterized by at least one second parameter. In some embodiments, the plurality of signals is generated using a respective second plurality of values of the at least one second parameter. In some embodiments, the second plurality of values of the at least one second parameter is stored according to a second predetermined probability distribution function, and one of the second plurality of values of the at least one second parameter is received for each respective one of the generated plurality of signals, and the received one of the second plurality of values of the at least one second parameter is used in generating the respective one of the generated plurality of signals.

In some embodiments, the at least one second parameter is related to a center frequency of at least one of the generated plurality of signals. In some embodiments, the at least one parameter is related to noise characteristics related to at least one of the plurality of signals. In some embodiments, the at least one parameter is related to chirp characteristics related to at least one of the plurality of signals. In some embodiments, the at least one parameter is related to frequency-shift keying (FSK) parameters related to at least one of the plurality of signals. In some embodiments, the at least one parameter is related to inter-pulse modulation characteristics related to at least one of the plurality of signals. In some embodiments, the probability distribution function is a Gaussian probability distribution function.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

In the following detailed description of the illustrated embodiments, reference is made to accompanying drawings, which form a part thereof, and within which are shown by way of illustration, specific embodiments, by which the subject matter may be practiced. It is to be understood that other embodiments may be utilized and structural changes may be made without departing from the scope of the disclosure.

The particulars shown herein are by way of example and for purposes of illustrative discussion of the embodiments only and are presented in the case of providing what is believed to be the most useful and readily understood description of the principles and conceptual aspects of the disclosure. In this regard, no attempt is made to show structural details of the subject matter in more detail than is necessary for the fundamental understanding of the disclosure, the description taken with the drawings making apparent to those skilled in the art how the several forms of the present disclosure may be embodied in practice. Further, like reference numbers and designations in the various drawings indicate like elements.

Described herein are devices and techniques for generating weighted parameter sets, which can be randomly addressed for dictating a waveform of each pulse to be generated by using a probability distribution function loader to load a memory table with waveform parameter values, wherein the values are loaded according to a weighted probability distribution function. Each value is then randomly addressed in the memory table and/or randomly selected from the memory table by a random number generator and fed into a signal generation circuit for creation of the waveform to be transmitted.

Figure 1A:
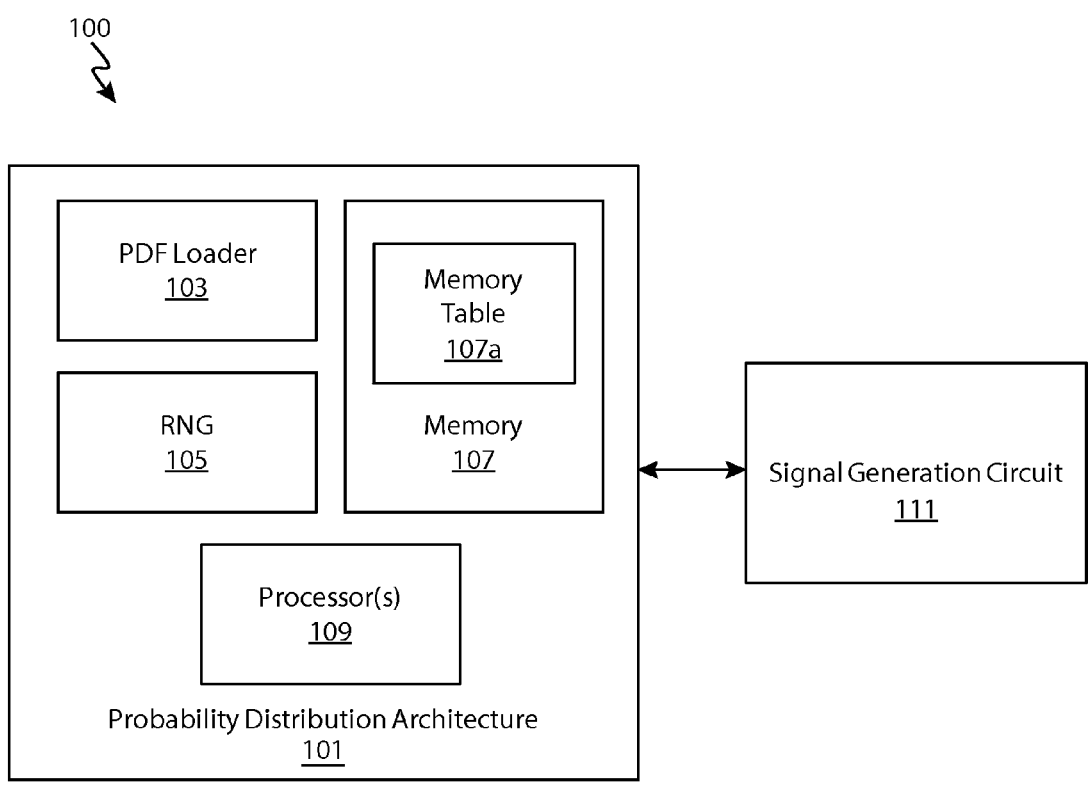
FIGS. 1A-1B are block diagrams illustrating a radio waveform generation device in accordance with various embodiments.
Figure 1B:
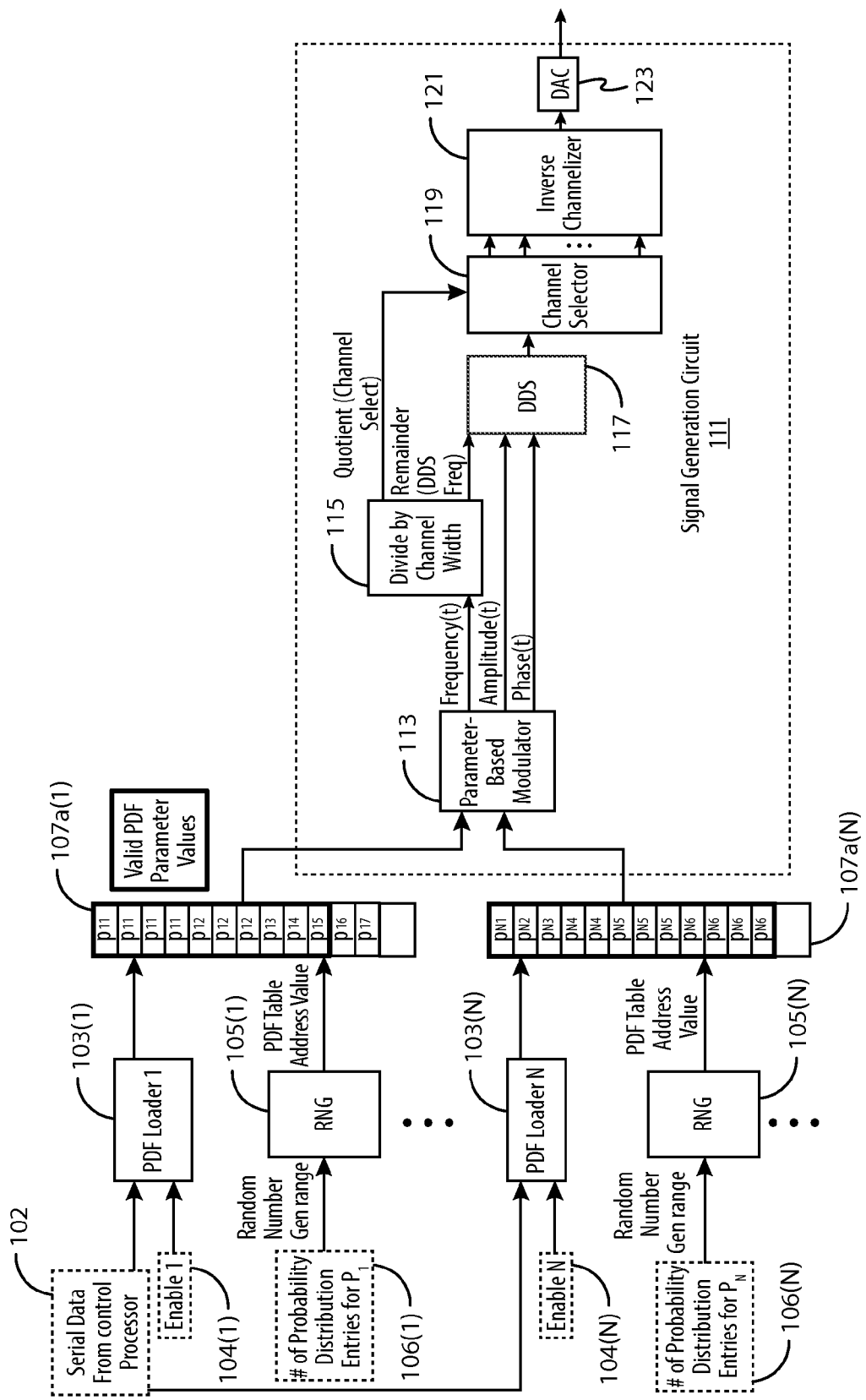

Referring to FIGS. 1A-1B, in accordance with various embodiments, a radio waveform generation device 100 includes a probability distribution architecture 101 for enabling and storing parameter sets according to a specified probability distribution and a signal generation circuit 111 for generating a plurality of signals having a particular waveform dictated by the probability distribution architecture.

The probability distribution architecture 101, in accordance with various embodiments, includes a probability distribution function (PDF) loader 103 for creating a value entry distribution by associating each of a plurality of possible parameter values with one or more of the overall number of slots in a memory table 107a of a memory 107, a random number generator (RNG) 105 for associating a value entry with a random address in the memory table and/or selecting a value entry associated with a random address in the memory table 107a of the memory 107, and one or more optional processors 109 for executing instructions for operating the PDF loader 103 and the RNG 105.

Figure 2:
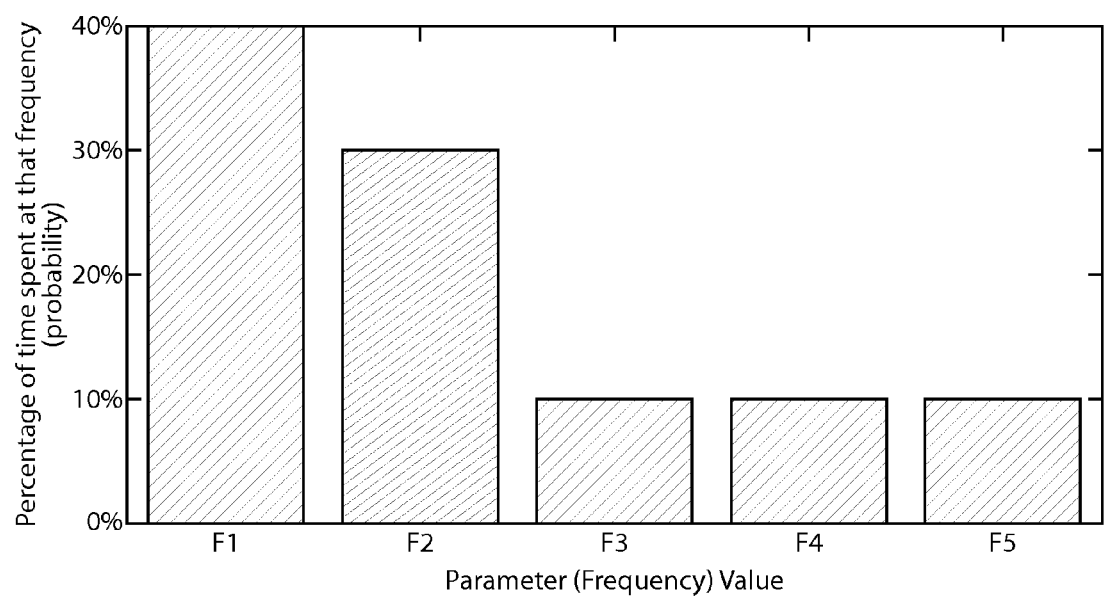
FIG. 2 is a graphical illustration showing an exemplary distribution of frequency values in accordance with various embodiments.

When an enabling command is given 104(1)-104(N), the PDF loader 103, in accordance with various embodiments, is configured to apply a probability distribution function (PDF) to a plurality of possible parameter values, received from processor 109, which can be included in serial data 102, to create a plurality of value entries to be stored in the memory 107. In the non-limiting exemplary embodiment shown in FIG. 2, the PDF loader 103 was applied to a frequency parameter having five possible values (F1, F2, F3, F4, and F5). After application of the PDF based according to weights, which can be included in serial data 102, assigned to each of F1, F2, F3, F4, and F5, 40% of the total number of stored value entries will be associated with frequency F1, 30% will be associated with frequency F2, and 10% each will be associated with frequencies F3-F5. This distribution is scalable to fit memory tables 107a of any size, e.g., F1 will be stored 40 times if the memory table 107*a* has 100 slots but will be stored 400 times if the memory table has 1,000 slots. The value entries are therefore non-uniformly distributed in memory table 107*a* to create a weighted parameter value set. Probability distribution functions, in accordance with various embodiments, can include, but are not limited to, a Gaussian distribution, a Rayleigh distribution, a normal distribution, a log-normal distribution, a gamma distribution, a binomial distribution, a Cauchy distribution, a Weibull distribution, or any other suitable probability distribution. It will be apparent in view of this disclosure that, while the exemplary embodiment illustrated by FIG. 2 relates to a frequency parameter set, weighted parameter value sets can be created for any type of parameter, e.g., pulse width, pulse repetition rate, chirp rate, amplitude, frequency, and/or any combination thereof.

The RNG 105 can be configured to randomly or pseudorandomly assign an address in the memory table 107*a* to each value entry created by the PDF loader 103 and/or configured to randomly or pseudorandomly select a location in the memory table 107*a* from which to draw a value entry. The RNG 105 repeats this process according to the number of probability distribution entries 106(1)-106(N) allocated to each memory table 107*a*. When accessed, the value entry stored at the selected location is then fed into the signal generation circuit 111, which creates a signal to be transmitted having a waveform corresponding to the selected value entry. Using the exemplary data of FIG. 2, if the RNG 105 selected a value entry associated with frequency F1, the signal generation circuit 111 would create a signal to be transmitted, wherein the waveform has a frequency F1. Therefore, a weighted parameter value set, determined according to a probability distribution function, can be transmitted in a randomized order. This configuration allows the radio waveform generation device 100 to control the dwell time at each parameter value in the weighted parameter set while maintaining an unpredictable agility with respect to that parameter. Random number generators 105, in accordance with various embodiments, can include, but are not limited to hardware random number generators, pseudorandom number generators, deterministic random bit generators, Mersenne twisters, Yarrow algorithms, stream ciphers, Fortuna, CryptGenRandom, and/or any other suitable random number generator.

In accordance with various embodiments, randomization of both the addressing of the value entries and the selection of the value entries may be desired. It will be apparent in view of the present disclosure that, in accordance with various such embodiments, a single RNG 105 and/or any number of additional RNGs 105 can be used. In accordance with various embodiments, a particular address loading sequence and/or a particular selection sequence may be desired. It will be apparent in view of the present disclosure that, in accordance with various such embodiments, no RNG 105 is included in the system. Instead, in such embodiments, each value entry is loaded and/or selected according to a predefined sequence.

Memory 107, in accordance with various embodiments, can include, but is not limited to, read-only memory, random access memory (RAM), mass storage devices, e.g., magnetic, magneto-optical disks, or optical disks, EPROM, EEPROM, flash memory devices, magnetic disks, internal hard disks, removable disks, CD-ROM, and/or DVD-ROM disks.

The one or more optional processors 109, in accordance with various embodiments, can include, but are not limited to, general and special purpose microprocessors, field programmable gate arrays (FPGA), application-specific integrated circuits (ASIC), and/or any one or more processors of any kind of digital computer.

As shown in FIG. 1B, it will be apparent in view of this disclosure that any number of weighted parameter value sets can be created by creating a plurality of memory tables 107*a*(1)-107*a*(N) using a plurality of PDF loaders 103(1)-103(N) and a plurality of random number generators 105(1)-105(N). Multiple weighted parameter sets, in accordance with various embodiments, can be advantageous because multiple parameters, e.g., frequency, pulse width, pulse repetition rate, chirp rate, and/or amplitude, can be modified (independently or simultaneously) by selecting value entries from multiple memory tables 107*a*(1)-107*a*(N) for greater waveform agility.

Also advantageously, in accordance with various embodiments, one or more of the multiple weighted parameter sets can be designated for each of a plurality of operating conditions. Using the example of FIG. 2, if operating conditions changed and frequency F5 became more important while frequency F1 became less important, the radio waveform generation device 100 could select a memory table 107*a* loaded with a more appropriate weighted parameter set, where the weights associated with each value were different, causing the PDF loader 103 to associate 40% of the value entries to F5 and only 10% of the value entries to F1, thereby shifting the distribution of center frequencies of the weighted parameter set.

Additionally, in accordance with various embodiments, the center frequency can remain constant but the PDF loader 103(1)-103(N) can apply a different PDF to achieve a different frequency bandwidth distribution. Using the example of FIG. 2, when appropriate, the radio waveform generation device 100 could select a memory table 107*a* loaded according to a different PDF, causing the PDF loader 103 to associate 30% of the value entries to F1, 25% of the value entries to F2, and 15% of the value entries to each of F3, F4, and F5, thereby maintaining the center frequency of the weighted parameter set while altering the frequency bandwidth distribution.

The signal generation circuit 111, e.g., a signal generation circuit as shown in FIG. 1B and/or a signal generation circuit as described in U.S. patent application Ser. No. 13/910,731, which is incorporated herein by reference, is configured to receive one or more of the value entries from the memory table 107*a* of the probability distribution architecture 101. The signal generation circuit 111 is further configured to, for each value entry received from the probability distribution architecture 101, generate a signal pulse having a waveform corresponding to the parameter values of the received value entry. As previously described above, using the exemplary data of FIG. 2, if the signal generation circuit 111 received a value entry associated with frequency F1, the signal generation circuit 111 would create a signal to be transmitted, wherein the waveform has a frequency F1.

In accordance with various embodiments, FIG. 1B illustrates an exemplary signal generation circuit including a parameter-based modulator 113, details of which are described, for example, in U.S. patent application Ser. No. 13/910,731, incorporated herein by reference, for determining, from the one or more received value entries, at least a frequency, amplitude, and phase of the waveform to be generated. The signal generation circuit 111 then divides 115 the frequency into one or more channels, synthesizes the frequency, amplitude, and phase to form a digital signal using a direct digital synthesizer (DDS) 117, inputs the synthesized digital signal into a channel selector 119, and then uses an inverse channelizer 121 consolidate the channels into a digital waveform. The digital waveform is then converted, using a digital to analog converter (DAC) 123, to an analog signal for transmission, e.g., by an antenna.

Figure 3:
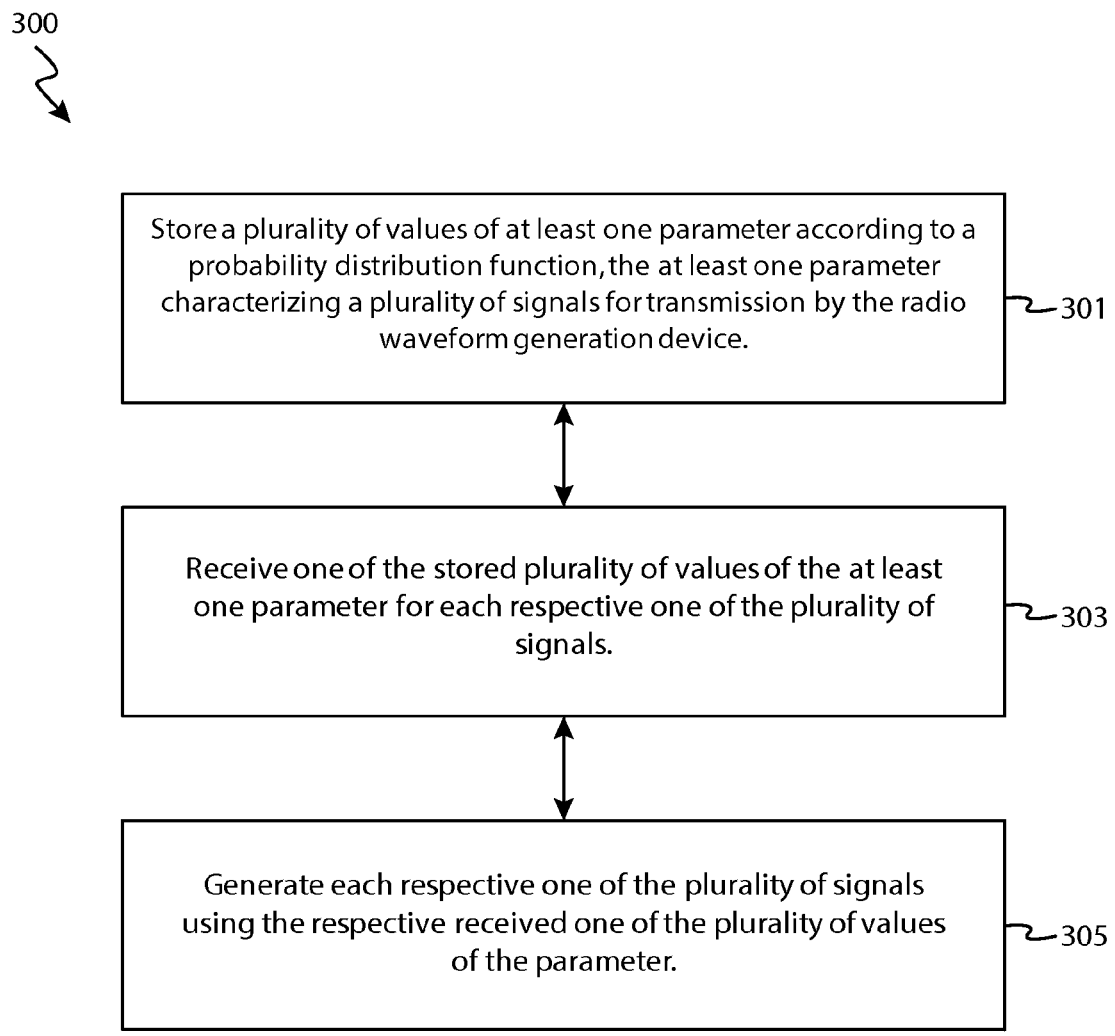
FIG. 3 is a flow chart illustrating a method for generating radio frequency waveform signals in accordance with various embodiments.

Referring now to FIG. 3, in accordance with various embodiments, a method 300 for generating radio frequency waveform signals in a radio waveform generation device can include the steps of storing 301 a plurality of values of at least one parameter according to a probability distribution function, the at least one parameter characterizing a plurality of signals for transmission by the radio waveform generation device, receiving 303 one of the stored plurality of values of the at least one parameter for each respective one of the plurality of signals, and generating 305 each respective one of the plurality of signals using the respective received one of the plurality of values of the parameter.

In step 301, a plurality of values of at least one parameter are stored according to a probability distribution function, the at least one parameter characterizing a plurality of signals for transmission by the radio waveform generation device. Step 301 can be performed using PDF loaders 103, random number generators 105, and/or memory tables 107a according to, for example but not limited to, the techniques described above with reference to FIGS. 1A, 1B, and 2.

In steps 303 and 305, one of the stored plurality of values of the at least one parameter is received for each respective one of the plurality of signals and each respective one of the plurality of signals is generated using the respective received one of the plurality of values of the parameter. Steps 303 and 305 are not limited to but may, in accordance with various embodiments, include using a signal generation circuit 111 according to the techniques described above with reference to FIGS. 1A, 1B, and 2 as well as in U.S. patent application Ser. No. 13/910,731, incorporated herein by reference.

Various embodiments of the above-described systems and methods may be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by, and an apparatus can be implemented as, special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data, e.g., magnetic, magneto-optical disks, or optical disks.

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device, e.g., a mouse or a trackball, by which the user can provide input to the computer, e.g., interact with a user interface element. Other kinds of devices can be used to provide for interaction with a user. Other devices can, for example, be feedback provided to the user in any form of sensory feedback, e.g., visual feedback, auditory feedback, or tactile feedback. Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication, e.g., a communication network. Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network, e.g., local area network (LAN), wide area network (WAN), campus area network (CAN), metropolitan area network (MAN), home area network (HAN)), a private IP network, an IP private branch exchange (IPBX), a wireless network, e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network, e.g., RAN, Bluetooth, code-division multiple access (CDMA) network, time division multiple access (TDMA)

network, global system for mobile communications (GSM) network), and/or other circuit-based networks.

The computing system can also include one or more computing devices. A computing device can include, for example, a computer, a computer with a browser device, a telephone, an IP phone, a mobile device, e.g., cellular phone, personal digital assistant (PDA) device, laptop computer, electronic mail device, and/or other communication devices. The browser device includes, for example, a computer, e.g., desktop computer, laptop computer, with a World Wide Web browser, e.g., Microsoft® Internet Explorer® available from Microsoft Corporation, Mozilla® Firefox available from Mozilla Corporation. The mobile computing device includes, for example, a Blackberry®, iPAD®, iPhone® or other smartphone device.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present disclosure has been described with reference to example embodiments, it is understood that the words that have been used herein, are words of description and illustration, rather than words of limitation. Changes may be made, within the purview of the appended claims, as presently stated and as amended, without departing from the scope and spirit of the present disclosure in its aspects.

Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A radio waveform generation device, comprising:
   a memory;
   a probability distribution module, coupled to the memory, configured to apply a first predetermined probability distribution function to a first plurality of predetermined parameter values to create a first plurality of parameter values of at least one first parameter and configured to randomly assign each value of the first plurality of values to a respective location in the memory; and
   a signal generation circuit, coupled to the memory, configured to receive the first plurality of values from the memory and configured to generate a first plurality of signals,
   each one of the signals characterized by the at least one first parameter, and each one of the signals generated using a respective one of the received first plurality of values.

2. The radio waveform generation device of claim 1, wherein each value of the first plurality of values of the at least one first parameter is stored in the memory in a quantity of repetitive occurrences determined according to the first predetermined probability distribution function.

3. The radio waveform generation device of claim 1, wherein each value of the first plurality of values of the at least one first parameter is randomly received from the memory for use by the signal generation circuit in generating the respective signal.

4. The radio waveform generation device of claim 1, wherein each value of the first plurality of values of the at least one first parameter is received from the memory in accordance with a predetermined sequence for use by the signal generation circuit in generating the respective signal.

5. The radio waveform generation device of claim 1, wherein the memory stores a second plurality of values of the at least one first parameter generated according to a second predetermined probability distribution function.

6. The radio waveform generation device of claim 5, wherein the signal generation circuit is further configured to receive the second plurality of values from the memory and generate a second plurality of signal, each of the second plurality of signals being characterized by the at least one first parameter,
   wherein each one of the generated second plurality of signals is generated using a respective one of the received second plurality of values.

7. The radio waveform generation device of claim 1, wherein:
   each one of the first plurality of signals is further characterized by at least one second parameter;
   the probability distribution module further configured to apply a second predetermined probability distribution function to a second plurality of predetermined parameter values to create a second plurality of parameter values of the at least one second parameter and configured to randomly assign each value of the second plurality of values to a respective location in the memory;
   the signal generation circuit further configured to receive the second plurality of values from the memory and further configured to generate the first plurality of signals, each one of the signals generated using a respective one of the received second plurality of values.

8. The radio waveform generation device of claim 1, wherein the at least one first parameter is related to a center frequency of at least one of the first plurality of signals.

9. The radio waveform generation device of claim 1, wherein the at least one first parameter is related to noise characteristics related to at least one of the first plurality of signals.

10. The radio waveform generation device of claim 1, wherein the at least one first parameter is related to chirp characteristics related to at least one of the first plurality of signals.

11. The radio waveform generation device of claim 1, wherein the at least one first parameter is related to frequency-shift keying (FSK) parameters related to at least one of the first plurality of signals.

12. The radio waveform generation device of claim 1, wherein the at least one first parameter is related to inter-pulse modulation characteristics related to at least one of the first plurality of signals.

13. The radio waveform generation device of claim 1, wherein the first predetermined probability distribution function is at least one of a Gaussian distribution, a Rayleigh distribution, a normal distribution, a log-normal distribution, a gamma distribution, a binomial distribution, a Cauchy distribution, or a Weibull distribution.

14. A method of generating radio frequency waveform signals in a radio waveform generation device, comprising:
   applying a first predetermined probability distribution function to a first plurality of predetermined parameter values to create a first plurality of parameter values of at least one first parameter;
   randomly assigning each value of the first plurality of values to a respective location in a memory;

receiving the stored first plurality of values of the at least one first parameter from the memory; and generating a first plurality of signals, each one of the signals being characterized by the at least one first parameter, and each one of the generated plurality of signals using a respective one of the received first plurality of values.

15. The method of claim 14, wherein each value of the first plurality of values of the at least one first parameter is stored in the memory in a quantity of repetitive occurrences determined according to the first predetermined probability distribution function.

16. The method of claim 14, further comprising randomly receiving each value of the first plurality of values of the at least one first parameter from the memory for use in generating the respective signal.

17. The method of claim 14, further comprising receiving each value of the at least one parameter from the memory in accordance with a predetermined sequence for use in generating the respective signal.

18. The method of claim 14, further comprising storing a second plurality of values of the at least one first parameter generated according to a second predetermined probability distribution function.

19. The method of claim 18, further comprising generating a second plurality of signals, each of the second plurality of signals being characterized by the at least one first parameter, and each one of the second plurality of signals using a respective one of the received second plurality of values.

20. The method of claim 14, wherein:

each one of the first plurality of signals is further characterized by at least one second parameter;

applying a second predetermined probability distribution function to a second plurality of predetermined parameter values to create a second plurality of parameter values of the at least one second parameter;

randomly assigning each value of the second plurality of values to a respective location in the memory;

receiving the stored second plurality of values of the at least one second parameter from the memory; and generating the first plurality of signals, each one of the plurality of signals generated using a respective one of the received second plurality of values of the at least one second parameter.

21. The method of claim 14, wherein the at least one first parameter is related to a center frequency of at least one of the generated first plurality of signals.

22. The method of claim 14, wherein the at least one first parameter is related to noise characteristics related to at least one of the first plurality of signals.

23. The method of claim 14, wherein the at least one first parameter is related to chirp characteristics related to at least one of the first plurality of signals.

24. The method of claim 14, wherein the at least one first parameter is related to frequency-shift keying (FSK) parameters related to at least one of the first plurality of signals.

25. The method of claim 14, wherein the at least one first parameter is related to inter-pulse modulation characteristics related to at least one of the first plurality of signals.

26. The method of claim 14, wherein the first predetermined probability distribution function is at least one of a Gaussian distribution, a Rayleigh distribution, a normal distribution, a log-normal distribution, a gamma distribution, a binomial distribution, a Cauchy distribution, or a Weibull distribution.

* * * * *